US011634369B2

(12) United States Patent
Li et al.

(10) Patent No.: US 11,634,369 B2
(45) Date of Patent: Apr. 25, 2023

(54) JOINT CONTROL METHOD FOR NITROGEN AND PHOSPHORUS EMISSIONS IN FARMLANDS

(71) Applicant: Shandong Academy of Agricultural Sciences Institute of Agricultural Resources and Environment, Jinan (CN)

(72) Inventors: Yan Li, Jinan (CN); Longyun Fu, Jinan (CN); Xiuchu Liu, Jinan (CN); Yongping Jing, Jinan (CN); Luji Bo, Jinan (CN); Ming Sun, Jinan (CN); Ziwen Zhong, Jinan (CN)

(73) Assignee: Shandong Academy of Agricultural Sciences Institute of Agricultural Resources and Environment, Jinan (CN)

(*) Notice: Subject to any disclaimer, the term of this patent is extended or adjusted under 35 U.S.C. 154(b) by 3 days.

(21) Appl. No.: 17/188,105

(22) Filed: Mar. 1, 2021

(65) Prior Publication Data

US 2021/0300836 A1 Sep. 30, 2021

(30) Foreign Application Priority Data

Mar. 27, 2020 (CN) .......................... 202010229440.X

(51) Int. Cl.
*C05G 3/80* (2020.01)
*C05F 17/60* (2020.01)
*C05F 17/20* (2020.01)

(52) U.S. Cl.
CPC ................ *C05G 3/80* (2020.02); *C05F 17/20* (2020.01); *C05F 17/60* (2020.01)

(58) Field of Classification Search
CPC ... C05G 3/80; C05G 3/00; C05F 17/00; C05F 17/20; C05F 17/60; Y02W 30/40; C05D 9/00; A01B 79/00; A01B 79/02; Y02P 20/145
See application file for complete search history.

(56) References Cited

FOREIGN PATENT DOCUMENTS

| CN | 105566012 A | * | 5/2016 | ............... C05G 3/80 |
| CN | 107151191 A | * | 9/2017 | ............... C05B 7/00 |
| CN | 107473868 A | * | 12/2017 | ............... C05G 3/00 |

OTHER PUBLICATIONS

Machine translation of CN-107151191-A (Year: 2017).*
Machine translation of CN-107473868-A (Year: 2017).*
Machine translation of CN-105566012-A (Year: 2016).*

* cited by examiner

*Primary Examiner* — Jennifer A Smith
(74) *Attorney, Agent, or Firm* — C. Tumey Law Group PLLC

(57) ABSTRACT

The present disclosure provides a joint control method for nitrogen and phosphorus emissions in farmlands, comprising: reducing nitrogen and phosphorus input during crop sowing or planting by applying composite organic material and chemical fertilizer, wherein the composite organic material comprises: 200-250 parts of edible fungi residues, 300-350 parts of charcoal and 5-10 parts of rhamnolipid; constructing a nitrogen-phosphorus retention layer by utilizing composite microbial agent in combination with 150 parts of edible fungi residues and 20 parts of straw-based hydrogel; constructing a barrier layer by utilizing composite material, and controlling downward leaching of nitrogen and phosphorus that are not absorbed by crops, wherein the composite material of the barrier layer comprises: 25-35 parts of straw-based hydrogel, 20-30 parts of edible fungi residues, 35-55 parts of bentonite and 5-10 parts of corn flour.

2 Claims, No Drawings

Specification includes a Sequence Listing.

JOINT CONTROL METHOD FOR NITROGEN AND PHOSPHORUS EMISSIONS IN FARMLANDS

CROSS REFERENCE TO RELATED APPLICATION

This application claims the priority of Chinese Patent Application No. 202010229440.X, entitled "joint control method for nitrogen and phosphorus emissions in farmlands" filed with China National Intellectual Property Administration on Mar. 27, 2020, which is incorporated herein by reference in its entirety.

TECHNICAL FIELD

The present disclosure relates to the technical field of agricultural environmental protection, and more particularly relates to a joint control method for nitrogen and phosphorus emissions in farmlands.

BACKGROUND ART

Nitrogen and phosphorus non-point source pollution to the environment in agriculture significantly exceeds point source pollution in industry and life in China. Ecological and environmental problems brought by facility agriculture production process are particularly prominent. Main reasons of the problems are as follows: the cultivated area of greenhouse vegetables is greatly increased in recent years; for high yield and high income, some vegetable growers have excessive fertilizer input and irrigation; and unreasonable management has resulted in deterioration of facility farmland soil and decreased water and fertilizer retention abilities. The amount of nitrogen and phosphorus input by the vegetable growers greatly exceeds the actual demand of crops several times, while a lot of nitrogen and phosphorus that are not absorbed by the crops are accumulated in the soil, so groundwater leaching is greatly increased, thereby causing risk of nitrate pollution in the groundwater and bringing serious pollution problems. Therefore, it is of great significance to find a method that can not only meet crop growth needs, but also reduce nitrogen and phosphorus emissions in soil, which can promote agricultural sustainable development of China and solve nitrogen and phosphorus non-point source pollution of vegetable cultivation soil.

In recent years, many researchers have conducted related researches on reducing nitrogen and phosphorus emissions in farmlands. The major research technological approaches include biotechnology, chemical technology, engineering technology and comprehensive emission reduction technology. Meanwhile, field trials are conducted in partial researches, and preliminary results are achieved. For example, in Chinese patent literature such as CN 105002869 A and CN 106211844 A, by constructing an ecological intercepting ditch, nitrogen and phosphorus emissions in farmlands are reduced in a manner of purifying nitrogen and phosphorus nutrient runoff in farmlands by virtue of vegetation interception or constructing buffer zones, and then discharging the nitrogen and phosphorus nutrient runoff. The above methods are applicable to southern water network area with large precipitation and major nitrogen and phosphorus surface runoff loss. Moreover, for example, in Chinese patent literature such as CN 1915917 A and CN 108752095 A, the nitrogen and phosphorus loss and resulting pollution are technically regulated by controlling pollution sources with technical products or blocking leaching process. However, the above control approaches are relatively simple, and only partial links of the nitrogen and phosphorus losses are controlled, which can not control the nitrogen and phosphorus pollution in the whole process and to the utmost extent. Therefore, it is an urgent problem to find a comprehensive control method for reducing nitrogen and phosphorus emissions in facility farmlands at present.

SUMMARY OF THE INVENTION

In order to solve the above technical problems, the present disclosure provides a joint control method for nitrogen and phosphorus emissions in farmlands. With the adoption of joint control of composite organic material, microbial agent and composite barrier material in the present disclosure, the nitrogen and phosphorus utilization ratio of crops is comprehensively increased, and the nitrogen and phosphorus losses are reduced.

To achieve the above purpose, technical schemes provided by the present disclosure are as follows:

The present disclosure provides a composite organic material for the joint control of nitrogen and phosphorus emissions in farmlands. The composite organic material includes the following components in parts by weight: 200-250 parts of edible fungi residues, 300-350 parts of charcoal and 5-10 parts of rhamnolipid.

Preferably, the composite organic material with high carbon, low nitrogen and phosphorus is prepared by a method comprising: mixing composite organic materials; adjusting initial moisture content to 60-70%; carrying out ventilated aerobic fermentation; turning piles once every 4-5 days during fermentation; and ensuring moisture content of the fermented material to be 30-40%.

Preferably, the fermentation is carried out at a temperature of 40-60° C.; and the fermentation is carried out for 20-30 days.

The present disclosure provides a composite barrier material for the joint control of nitrogen and phosphorus emissions in farmlands. The composite barrier material includes the following components in parts by weight: 25-35 parts of straw-based hydrogel, 20-30 parts of edible fungi residues, 35-55 parts of bentonite and 5-10 parts of corn flour.

The present disclosure provides a joint control method for nitrogen and phosphorus emissions in farmlands. The joint control method includes: a. laying a composite barrier material on the lower layer of crop roots; b. adding a composite microbial agent to the distribution layer of the crop roots, and simultaneously adding edible fungi residues and straw-based hydrogel; c. performing farmland fertilization: applying the composite organic material and a chemical fertilizer to farmlands as a basic fertilizer during crop sowing or planting, wherein the amount of the basic fertilizer is 40-55% of the nutrient amount required during the whole growth period of crops.

Preferably, the depth of the lower layer of crop roots is 40-60 cm.

Preferably, the depth of the distribution layer of crop roots is 0-40 cm.

Preferably, the composite microbial agent is composed of soybean fermentation *Bacillus, Bacillus subtilis* and *Bacillus amyloliquefaciens* in a ratio of 1:1:1.

Preferably, the soybean fermentation *Bacillus* has a collection number of CGMCC NO. 17806, the *Bacillus subtilis* has a collection number of CGMCC NO. 1.268, and the *Bacillus amyloliquefaciens* has a collection number of ATCC 23350.

Compared with the prior art, the present disclosure has beneficial effects as follows:

with respect to existing agricultural production modes, the present disclosure provides a joint control method for nitrogen and phosphorus emissions in farmlands, which jointly controls three links of nitrogen and phosphorus losses. The first is to reduce the source input link of fertilizer input, apply organic materials (instead of traditional organic fertilizer) with high carbon, low nitrogen and phosphorus and chemical fertilizer to reduce the application rate of the chemical fertilizer; the second is to increase the link of nitrogen and phosphorus fixation of root layer soil, add microbial agents with nitrogen fixation and phosphorus accumulation function to the crop root layer and provide a suitable living environment to build a fixation layer to reduce the leaching risk of nitrogen and phosphorus; the third is to construct the leaching barrier layer of the lower root layer, which uses composite barrier materials to construct the barrier layer in the leaching risk layer of the lower root layer, and then separates and adsorbs the nitrogen and phosphorus nutrients leached to the lower root layer, and then distributes the retained nutrients to the tillage layer through the next season's ploughing operation, thus realizing the secondary utilization of nitrogen and phosphorus nutrients.

(1) In the present disclosure, the composite organic material is used as the basic fertilizer to replace the traditional livestock manure organic fertilizer; compared with the traditional organic fertilizer, the composite organic material has the characteristics of high carbon and low nitrogen and phosphorus, avoids the problem that excessive nitrogen and phosphorus are added into the soil due to application of the basic fertilizer, improves the carbon-nitrogen ratio of the soil, which is beneficial to the fixation of nitrogen and phosphorus in the soil. The composite organic material has excellent water and fertilizer retention effects, which not only reduces emissions of the nitrogen and phosphorus in the soil, but also improves physicochemical properties of the soil and the utilization rate of plants to the fertilizer.

(2) In the present disclosure, the barrier layer is constructed by the composite barrier layer material so as to prevent downward leaching of the nitrogen and phosphorus; the construction of new greenhouse and soil replacement of old greenhouse are carried out simultaneously, without the subsequent maintenance. The used material is economic, environment-friendly, readily available and wide in source, and will not cause secondary pollution after applied to the soil, which not only can fix the nitrogen and phosphorus in the soil, but also can increase soil fertility and organic matter content, and improve the microbial environment of the soil.

(3) In the present disclosure, due to the addition of the composite microbial agent, the utilization ratio of the nitrogen and phosphorus by crop roots is increased; and the downward leaching risk of the nitrogen and phosphorus is lowered.

(4) The joint control method in the present disclosure can reduce the amount of the chemical fertilizer, comprehensively improve the nitrogen and phosphorus utilization ratio of the crops and reduce the nitrogen and phosphorus losses, and also can prevent the pollution of the nitrogen and phosphorus in the leaching process.

Collection Information of Biological Samples

Soybean fermentation *Bacillus*, which has a classification name of *Bacillus glycinifermentans*, is isolated from biogas slurry of a well-run straw-based anaerobic biogas fermentation device in Shandong province, and has been collected in China General Microbiological Culture Collection Center on May 15, 2019. The collection address is #1 Yard, Beichen West Road, Chaoyang District of Beijing, Institute of Microbiology, Chinese Academy of Sciences, postcode 100101. The culture collection number is CGMCC NO. 17806.

The *Bacillus subtilis* has a collection number of CGMCC NO. 1.268 and is purchased from China General Microbiological Culture Collection Center.

The *Bacillus amyloliquefaciens* has a collection number of ATCC 23350 and is purchased from American Type Culture Collection Center.

DETAILED DESCRIPTION

The present disclosure provides a composite organic material for the joint control of nitrogen and phosphorus emissions in farmlands. The composite organic material can reduce the application amount of the chemical fertilizer, maintain moisture and retain water-soluble nitrogen and phosphorus, reduce emissions of the nitrogen and phosphorus in soil, improve physicochemical properties of the soil and increase the utilization rate of plants to the fertilizer. The composite organic material in the present disclosure includes the following components in parts by weight: 200-250 parts of edible fungi residues, 300-350 parts of charcoal and 5-10 parts of rhamnolipid.

The edible fungi residues in the composite organic material in the present disclosure contain rich organic matters, which can adjust the carbon-nitrogen ratio of the soil, and can provide lots of nutrients for growth of microorganisms and crops in the soil. Meanwhile, mycelia existing in the edible fungi residues can secrete multiple enzymes, which can decompose the complex organic matters in the soil into nutritive materials that are easily absorbed by plants. In addition, due to loose and porous structures, the edible fungi residues can achieve effects of maintaining moisture and retaining water-soluble nitrogen and phosphorus in the barrier layer. In the composite organic material of the present disclosure, the content of the edible fungi residues is preferably 200-250 parts by weight, more preferably 220-230 parts by weight. Sources of the edible fungi residues are not specially limited in the present disclosure, any conventional commercially available edible fungi residues in the art will do.

The charcoal in the composite organic material in the present disclosure has micro-porous structures and high adsorption capacity and, which can improve physicochemical properties of the soil and increase soil fertility, thereby indirectly facilitating nutrient utilization rate in the crop growth process. In addition, lots of micro-porous structures in the charcoal provide habitats, carbon sources and mineral nutrition for soil microorganisms, increase competitiveness of the microorganisms in the soil and promote growth of the microorganisms. Meanwhile, the charcoal is in synergic action with other materials in the composite organic material, thereby fully achieving the ability of the charcoal for adsorbing leaching nitrogen and phosphorus in the soil. In the composite organic material in the present disclosure, content of the charcoal is preferably 300-350 parts by weight, more preferably 320-330 parts by weight. The source of the charcoal is not specially limited in the present disclosure, any conventional commercially available charcoal in the art will do.

The rhamnolipid in the composite organic material in the present disclosure, which serves as a glycolipid-like anionic surfactant, has effects of stimulating crop growth, assisting nutrient absorption of crops and increasing fertilizer efficiency. In the composite organic material in the present disclosure, content of the rhamnolipid is preferably 5-15 parts by weight, more preferably 8-12 parts by weight. The source of the rhamnolipid is not specially limited in the present disclosure, any conventional commercially available rhamnolipid in the art will do.

In order to fully extract nutrition of the composite organic material, the composite organic material in the present disclosure needs to be fermented before being applied. The fermentation method of the composite organic material comprises: mixing composite organic material in the above parts by weight; adjusting initial moisture content to 60%; carrying out ventilated aerobic fermentation for 20-30 days; turning piles once every 4-5 days during fermentation; and ensuring moisture content of the fermented material to be 35%.

The present disclosure further provides a composite barrier material for the joint control of nitrogen and phosphorus emissions in farmlands. The composite barrier material prevents downward leaching of the nitrogen and phosphorus, not only can retain nitrogen and phosphorus in the soil, but also can increase soil fertility and organic matter content and improve the microbial environment of the soil. The composite barrier material in the present disclosure includes the following components in parts by weight: 25-35 parts of straw-based hydrogel, 20-30 parts of edible fungi residues, 35-55 parts of bentonite and 5-10 parts of corn flour.

The edible fungi residues in the composite barrier material in the present disclosure contain rich organic matters, which can adjust the carbon-nitrogen ratio of the soil, and can provide lots of nutrients for growth of microorganisms and crops in the soil. Meanwhile, mycelia existing in the edible fungi residues can secrete multiple enzymes, which can decompose the complex organic matters in the soil into nutritive materials that are easily absorbed by plants. In addition, due to loose and porous structures, the edible fungi residues can achieve effects of maintaining moisture and retaining water-soluble nitrogen and phosphorus in the barrier layer. In the composite barrier material in the present disclosure, content of the edible fungi residues is preferably 20-30 parts by weight, more preferably 24-27 parts by weight. Sources of the edible fungi residues are not specially limited in the present disclosure, any conventional commercially available edible fungi residues in the art will do.

The bentonite in the composite barrier material in the present disclosure has a micro-pore structure and high adsorption capacity, can retain nutrients in the micro-pore structure. At the same time, the bentonite provides habitats for microorganisms in the soil and prolongs nutrient retention time by enhancing microbial activity, which promotes growth of microorganisms and facilitates the transferation of the nutrients to the direction of plant utilization. Meanwhile, the bentonite is also a carrier of uniform distribution of the hydrogels and is in synergistic action with other materials, thereby fully achieving the ability of the bentonite for adsorbing leaching nitrogen and phosphorus in the soil. In the composite barrier material in the present disclosure, the content of the bentonite is preferably 35-55 parts by weight, more preferably 40-45 parts by weight. The source of the bentonite is not specially limited in the present disclosure, any conventional commercially available bentonite in the art will do.

The straw-based hydrogel in the composite barrier material in the present disclosure is a cross-linked polymer of an H-dimensional network structure that contains hydroxyl, carboxyl, amino and other polar groups or hydrophilic groups and is formed by covalent bond and hydrogen-bond interaction. The shape and structure of the straw-based hydrogel can be invariable after absorbing lots of water. Due to the special molecular structure, on one hand, the straw-based hydrogel can serve as a water-retaining agent to adjust water fertilizers of farmlands; on the other hand, the nitrogen and phosphorus dissolved into water can be intercepted and retained on the barrier layer by holding water, thereby preventing downward leaching of the nitrogen and phosphorus. In the composite barrier material in the present disclosure, content of the straw-based hydrogel is preferably 25-35 parts by weight, more preferably 30-35 parts by weight. The source of the straw-based hydrogel is not specially limited in the present disclosure, any conventional commercially available straw-based hydrogel in the art will do.

The corn flour in the composite barrier material in the present disclosure may provide a quick-acting carbon source for microorganisms in the barrier layer, which promotes metabolic activities of the microorganisms and accelerates denitrification of nitrogen, thereby preventing the continuous downward leaching of the nitrogen. In the composite barrier material in the present disclosure, content of the corn flour is preferably 5-10 parts by weight, more preferably 6-8 parts by weight. The source of the corn flour is not specially limited in the present disclosure, any conventional commercially available corn flour in the art will do.

In order to solve the problem that the approach of controlling the nitrogen and phosphorus pollution is single, comprehensively increase the nitrogen and phosphorus utilization ratio of crops and lower nitrogen and phosphorus losses, the present disclosure provides a joint control method for nitrogen and phosphorus emissions in farmlands, including:

a. a barrier system of the farmland leaching layer is set; facility farmland soil is dug down to the leaching loss risk layer on the lower layer of crop roots, wherein a depth of the leaching loss risk layer is 40-60 cm, more preferably 40-50 cm; a composite barrier material of 4-6 cm thick is laid and then compacted; and the dug surface soil is filled back to the distribution layer of crop roots.

b. 0.5-2 kg of composite microbial agent is added to the distribution layer of crop roots at a depth of 0-40 cm, more preferably 0-20 cm; edible fungi residues and straw-based hydrogel are added and spread out; and the dug surface soil is filled back.

In the present method, soybean fermentation *Bacillus*, *Bacillus subtilis* and *Bacillus amyloliquefaciens* are added in a ratio of 1:1:1. The composite microbial agent composed of the three strains has strong activity in soil and can partially decompose insoluble phosphorus in the soil into citric acid soluble phosphorus and water-soluble phosphorus. The phosphorus decomposition process is slow, so that the phosphorus can be absorbed and utilized by crops during decomposition. Therefore, input of the chemical phosphorus fertilizer can be decreased, and phosphorus leaching loss is reduced. In addition, the microbial agent can promote organic matter decomposition in the soil, release multiple active nutrients, promote root development, improve absorption and utilization efficiency of the crops to nutrients such as the nitrogen and phosphorus, and decrease the leaching loss. The soybean fermentation *Bacillus* has a collection number of CGMCC NO. 17806 and is isolated from biogas slurry of a well-run straw-based anaerobic biogas fermentation device in Shandong province. By virtue of identification and sequence analysis of 16SrDNA in the present disclosure, the 16SrDNA gene sequence of the strain is shown as a Sequence 1. Through comparison of the above gene sequence and corresponding sequence information of known strains in Genbank database, it shows that the strain is *Bacillus glycinifermentans*. The *Bacillus subtilis* has a collection number of CGMCC NO. 1.268 and is purchased from China General Microbiological Culture Collection Center. The *Bacillus amyloliquefaciens* has a collection number of ATCC 23350 and is purchased from American Type Culture Collection Center.

In the microbial agent of the present disclosure, the *Bacillus subtilis* (CGMCC NO. 1.268) and the *Bacillus amyloliquefaciens* (ATCC 23350) serving as probiotics can produce multiple antibacterial materials so as to inhibit pathogenic fungi occurring in the crop growth process. On one hand, it prevents the crop diseases and reduces the use of the chemical fertilizer; on the other hand, it eliminates competitors for nitrogen-fixing and phosphorus-accumulating microorganisms of crop roots, improves the activity of nitrogen-fixing and phosphorus-accumulating microorganisms and reduces the leaching risks of nitrogen and phosphorus in soil.

Degradation property test of the soybean fermentation *Bacillus* (CGMCC NO. 17806) in the present disclosure is as follows: 100 mL of basal culture medium is added into 500 mL of triangular flask (the basal culture medium includes the following components: 10 g/L of glucose, 0.5 g/L of ammonium sulfate, 0.3 g/L of magnesium sulfate, 0.3 g/L of sodium chloride, 0.3 g/L of potassium chloride, 0.03 g/L of manganese sulfate and 0.03 g/L of ferrous sulfate); 5 g/L of calcium phosphate is added; 2 mL of $1 \times 10^9$ cfu/mL bacterium solution of the soybean fermentation *bacillus* (CGMCC NO. 17806) is quantitatively inoculated; shaking culture is conducted at 37° C. at 150 r/min; sampling analysis is performed within 48 hours; the control group without bacteria is set; each sample is set with 3 repeats; and the concentration of calcium ions is determined by inductively coupled plasma mass spectrometry (ICP-MS). Experimental results shows that, the determined concentration of calcium ions in the control group is 13.27 mg/L, while the determined concentration of calcium ions in the experimental group added with the bacterium solution of the soybean fermentation *bacillus* (CGMCC NO. 17806) is 770.50 mg/L. The degradation rate is 5.14%. Therefore, insoluble calcium phosphate in the soil can be dissolved in metabolite secreted from the soybean fermentation *bacillus* (CGMCC NO. 17806) in the present disclosure. Moreover, the dissoluble phosphorus is adsorbed and stabilized by virtue of a polysaccharide structure on the bacterium surface, thereby facilitating absorption and utilization of the crops to the phosphorus.

In order to provide sufficient nitrogen sources for the above composite microorganisms, ensure moisture content of soil on the distribution layer of the crop roots and provide an excellent environment for the metabolic activity of the above composite microorganisms, 150 parts of the edible fungi residues and 20 parts of the straw-based hydrogel are added in parts by weight;

c. performing farmland fertilization: applying composite organic material with high carbon, low nitrogen and phosphorus and a chemical fertilizer to farmlands as a basic fertilizer during crop sowing or planting, wherein the amount of the basic fertilizer is 40-55% of the nutrient amount required during the whole growth period of crops. The application amount can be reasonably adjusted by those skilled in the art according to nitrogen and phosphorus conditions in the soil.

The joint control method in the present disclosure reduces the amount of the chemical fertilizer from the source, which not only can comprehensively increase the nitrogen and phosphorus utilization ratio of the crops, lowers the nitrogen and phosphorus losses, but also can prevent pollution produced by the nitrogen and phosphorus in the leaching process.

Technical solutions in the present disclosure will be clearly and fully described below in combination with embodiments in the present disclosure. Apparently, the embodiments described herein are merely one part of embodiments of the present disclosure, rather than the total embodiments. Based on the embodiments in the present disclosure, all other embodiments obtained by those ordinary skilled in the art without making creative labor shall belong to the protection scope of the present disclosure.

Example 1

A joint control method for nitrogen and phosphorus emissions in farmlands included:

a. a barrier system of the farmland leaching layer was set on the lower layer of crop roots; facility farmland soil was dug down to the leaching loss risk layer at a depth of 50 cm; a composite barrier material of 6 cm thick was laid and then compacted; and the dug surface soil was filled back to the distribution layer of crop roots;

the composite barrier material included the following components in parts by weight: 25 parts of straw-based hydrogel, 20 parts of edible fungi residues, 35 parts of bentonite and 5 parts of corn flour;

b. a composite microbial agent composed of soybean fermentation *Bacillus*, *Bacillus subtilis* and *Bacillus amyloliquefaciens* added in a ratio of 1:1:1 to the distribution layer of the crop roots; 150 parts of edible fungi residues and 20 parts of straw-based hydrogel in parts by weight were added and spread out; and the dug surface soil was filled back;

wherein collection numbers of the soybean fermentation *Bacillus*, *Bacillus subtilis* and *Bacillus amyloliquefaciens* were respectively CGMCC NO. 17806, CGMCC NO. 1.268 and ATCC 23350 in sequence; and c. performing farmland fertilization: applying high-carbon low-nitrogen composite organic material and a chemical fertilizer to farmlands as a basic fertilizer during crop sowing or planting, wherein the amount of the basic fertilizer was 40-55% of the nutrient amount required during the whole growth period of crops.

The composite organic material included the following components in parts by weight: 200 parts of edible fungi residues, 300 parts of charcoal and 5 parts of rhamnolipid.

After the above composite organic material was mixed in parts by weight, initial moisture content was adjusted to 65%; ventilated aerobic fermentation was carried out at 40-60° C. for 20-30 days; piles were turned once every 4-5 days during fermentation; and moisture content of the fermented material was ensured to be 30%.

Example 2

A joint control method for nitrogen and phosphorus emissions in farmlands included:

a. a barrier system of the farmland leaching layer was set on the lower layer of crop roots; facility farmland soil was dug down to the leaching loss risk layer at a depth of 50 cm; a composite barrier material of 6 cm thick was laid and then compacted; and the dug surface soil was filled back to the distribution layer of crop roots;

the composite barrier material included the following components in parts by weight: 30 parts of straw-based hydrogel, 25 parts of edible fungi residues, 40 parts of bentonite and 5 parts of corn flour;

b. a composite microbial agent composed of soybean fermentation *Bacillus, Bacillus subtilis* and *Bacillus amyloliquefaciens* added in a ratio of 1:1:1 to the distribution layer of the crop roots; 150 parts of edible fungi residues and 20 parts of straw-based hydrogel in parts by weight were added and spread out; and the dug surface soil was filled back;

wherein collection numbers of the soybean fermentation *Bacillus, Bacillus subtilis* and *Bacillus amyloliquefaciens* were respectively CGMCC NO. 17806, CGMCC NO. 1.268 and ATCC 23350 in sequence; and c. performing farmland fertilization: applying high-carbon low-nitrogen composite organic material and a chemical fertilizer to farmlands as a basic fertilizer during crop sowing or planting, wherein the amount of the basic fertilizer was 40-55% of the nutrient amount required during the whole growth period of crops.

The composite organic material included the following components in parts by weight: 250 parts of edible fungi residues, 300 parts of charcoal and 5 parts of rhamnolipid.

After the above composite organic material was mixed in parts by weight, initial moisture content was adjusted to 65%; ventilated aerobic fermentation was carried out at 40-60° C. for 20-30 days; piles were turned once every 4-5 days during fermentation; and moisture content of the fermented material was ensured to be 30%.

Example 3

A joint control method for nitrogen and phosphorus emissions in farmlands included:

a. a barrier system of the farmland leaching layer was set on the lower layer of crop roots; facility farmland soil was dug down to the leaching loss risk layer at a depth of 50 cm; a composite barrier material of 6 cm thick was laid and then compacted; and the dug surface soil was filled back to the distribution layer of crop roots;

the composite barrier material included the following components in parts by weight: 35 parts of straw-based hydrogel, 30 parts of edible fungi residues, 50 parts of bentonite and 6 parts of corn flour;

b. a composite microbial agent composed of soybean fermentation *Bacillus, Bacillus subtilis* and *Bacillus amyloliquefaciens* added in a ratio of 1:1:1 to the distribution layer of the crop roots; 150 parts of edible fungi residues and 20 parts of straw-based hydrogel in parts by weight were added and spread out; and the dug surface soil was filled back;

wherein collection numbers of the soybean fermentation *Bacillus, Bacillus subtilis* and *Bacillus amyloliquefaciens* were respectively CGMCC NO. 17806, CGMCC NO. 1.268 and ATCC 23350 in sequence; and c. performing farmland fertilization: applying high-carbon low-nitrogen composite organic material and a chemical fertilizer to farmlands as a basic fertilizer during crop sowing or planting, wherein the amount of the basic fertilizer was 40-55% of the nutrient amount required during the whole growth period of crops.

The composite organic material included the following components in parts by weight: 200 parts of edible fungi residues, 350 parts of charcoal and 6 parts of rhamnolipid.

After the above composite organic material was mixed in parts by weight, initial moisture content was adjusted to 70%; ventilated aerobic fermentation was carried out at 40-60° C. for 20-30 days; piles were turned once every 4-5 days during fermentation; and moisture content of the fermented material was ensured to be 35%.

Example 4

A joint control method for nitrogen and phosphorus emissions in farmlands included:

a. a barrier system of the farmland leaching layer was set on the lower layer of crop roots; facility farmland soil was dug down to the leaching loss risk layer at a depth of 50 cm; a composite barrier material of 6 cm thick was laid and then compacted; and the dug surface soil was filled back to the distribution layer of crop roots;

the composite barrier material included the following components in parts by weight: 35 parts of straw-based hydrogel, 30 parts of edible fungi residues, 50 parts of bentonite and 6 parts of corn flour;

b. a composite microbial agent composed of soybean fermentation *Bacillus, Bacillus subtilis* and *Bacillus amyloliquefaciens* added in a ratio of 1:1:1 to the distribution layer of the crop roots; 150 parts of edible fungi residues and 20 parts of straw-based hydrogel in parts by weight were added and spread out; and the dug surface soil was filled back;

wherein collection numbers of the soybean fermentation *Bacillus, Bacillus subtilis* and *Bacillus amyloliquefaciens* were respectively CGMCC NO. 17806, CGMCC NO. 1.268 and ATCC 23350 in sequence; and c. performing farmland fertilization: applying high-carbon low-nitrogen composite organic material and a chemical fertilizer to farmlands as a basic fertilizer during crop sowing or planting, wherein the amount of the basic fertilizer was 40-55% of the nutrient amount required during the whole growth period of crops.

The composite organic material included the following components in parts by weight: 200 parts of edible fungi residues, 350 parts of charcoal and 6 parts of rhamnolipid.

After the above composite organic material was mixed in parts by weight, initial moisture content was adjusted to 70%; ventilated aerobic fermentation was carried out at 40-60° C. for 20-30 days; piles were turned once every 4-5 days during fermentation; and moisture content of the fermented material was ensured to be 35%.

Example 5

A joint control method for nitrogen and phosphorus emissions in farmlands included:

a. a barrier system of the farmland leaching layer was set on the lower layer of crop roots; facility farmland soil was dug down to the leaching loss risk layer at a depth of 60 cm; a composite barrier material of 4 cm thick was laid and then compacted; and the dug surface soil was filled back to the distribution layer of crop roots;

the composite barrier material included the following components in parts by weight: 30 parts of straw-based hydrogel, 25 parts of edible fungi residues, 40 parts of bentonite and 6 parts of corn flour;

b. a composite microbial agent composed of soybean fermentation *Bacillus, Bacillus subtilis* and *Bacillus amyloliquefaciens* added in a ratio of 1:1:1 to the distribution layer of the crop roots; 150 parts of edible fungi residues and 20 parts of straw-based hydrogel in parts by weight were added and spread out; and the dug surface soil was filled back;

wherein collection numbers of the soybean fermentation *Bacillus, Bacillus subtilis* and *Bacillus amyloliquefaciens* were respectively CGMCC NO. 17806, CGMCC NO. 1.268 and ATCC 23350 in sequence; and c. performing farmland fertilization: applying high-carbon low-nitrogen composite organic material and a chemical fertilizer to farmlands as a basic fertilizer during crop sowing or planting, wherein the amount of the basic fertilizer was 40-55% of the nutrient amount required during the whole growth period of crops.

The composite organic material included the following components in parts by weight: 200 parts of edible fungi residues, 300 parts of charcoal and 6 parts of rhamnolipid.

After the above composite organic material was mixed in parts by weight, initial moisture content was adjusted to 65%; ventilated aerobic fermentation was carried out at 40-60° C. for 20-30 days; piles were turned once every 4-5 days during fermentation; and moisture content of the fermented material was ensured to be 30%.

Example 6

A joint control method for nitrogen and phosphorus emissions in farmlands included:

a. a barrier system of the farmland leaching layer was set on the lower layer of crop roots; facility farmland soil was dug down to the leaching loss risk layer at a depth of 50 cm; a composite barrier material of 6 cm thick was laid and then compacted; and the dug surface soil was filled back to the distribution layer of crop roots;

the composite barrier material included the following components in parts by weight: 35 parts of straw-based hydrogel, 30 parts of edible fungi residues, 50 parts of bentonite and 10 parts of corn flour;

b. a composite microbial agent composed of soybean fermentation *Bacillus, Bacillus subtilis* and *Bacillus amyloliquefaciens* added in a ratio of 1:1:1 to the distribution layer of the crop roots; 150 parts of edible fungi residues and 20 parts of straw-based hydrogel were added and spread out; and the dug surface soil was filled back;

wherein collection numbers of the soybean fermentation *Bacillus, Bacillus subtilis* and *Bacillus amyloliquefaciens* were respectively CGMCC NO. 17806, CGMCC NO. 1.268 and ATCC 23350 in sequence; and c. performing farmland fertilization: applying high-carbon low-nitrogen composite organic material and a chemical fertilizer to farmlands as a basic fertilizer during crop sowing or planting, wherein the amount of the basic fertilizer was 40-55% of the nutrient amount required during the whole growth period of crops.

The composite organic material included the following components in parts by weight: 250 parts of edible fungi residues, 350 parts of charcoal and 10 parts of rhamnolipid.

After the above composite organic material was mixed in parts by weight, initial moisture content was adjusted to 70%; ventilated aerobic fermentation was carried out at 40-60° C. for 20-30 days; piles were turned once every 4-5 days during fermentation; and moisture content of the fermented material was ensured to be 35%.

Example 7

Examples 1-6 were respectively applied to greenhouse vegetable lands for planting cucumber, tomato, pepper and custard squash; the input amounts of nutrients in the whole growth period of crops were respectively as follows: cucumber: 65 kg per mu of N, 90 kg per mu of $P_2O_5$, and 60 kg per mu of $K_2O$; tomato: 70 kg per mu of N, 80 kg per mu of $P_2O_5$ and 65 kg per mu of $K_2O$; pepper: 60 kg per mu of N, 85 kg per mu of $P_2O_5$ and 55 kg per mu of $K_2O$; and custard squash: 65 kg per mu of N, 85 kg per mu of $P_2O_5$ and 70 kg per mu of $K_2O$. The input amount of the nutrients in the control group was the same as that of the technical scheme in the present disclosure. Before applying all the materials, a field percolation pond was arranged 10 cm below the barrier layer for monitoring nitrogen and phosphorus content in leaching water after planting crops in greenhouse vegetable soil.

Test results were shown as Tables 1-2. Numerical values in the tables were nitrogen losses in the whole growth period; the selected test crops were autumn crops and winter crops; the test location was Lanling County, Shandong Province; and the test results were mean values of two seasons.

TABLE 1

Total nitrogen losses of facility farmlands

| Test treatment | Total nitrogen losses N $kg/hm^2$ | | | |
| --- | --- | --- | --- | --- |
| | Cucumber | Tomato | Pepper | Custard Squash |
| Example 1 | 40.1 ± 7.8 | 41.1 ± 12.9 | 40.2 ± 8.5 | 42.5 ± 6.7 |
| Example 2 | 48.9 ± 6.9 | 39.9 ± 9.8 | 41.5 ± 12.8 | 39.8 ± 5.8 |
| Example 3 | 52.6 ± 11.0 | 53.8 ± 7.1 | 38.2 ± 9.5 | 52.8 ± 2.9 |
| Example 4 | 53.4 ± 12.4 | 54.2 ± 10.4 | 53.8 ± 5.4 | 35.1 ± 5.8 |
| Example 5 | 60.6 ± 8.1 | 52.7 ± 11.6 | 50.5 ± 10.7 | 41.6 ± 9.4 |
| Example 6 | 61.2 ± 12.5 | 51.1 ± 7.8 | 52.4 ± 8.6 | 47.8 ± 6.5 |
| Control group | 114.0 ± 7.8 | 86.3 + 5.6 | 73.92 ± 6.3 | 63.1 ± 10.2 |

TABLE 2

Total phosphorus losses of facility farmlands

| Test treatment | Total phosphorus losses P $kg/hm^2$ | | | |
| --- | --- | --- | --- | --- |
| | Cucumber | Tomato | Pepper | Custard Squash |
| Example 1 | 0.45 ± 0.11 | 0.43 ± 0.08 | 0.47 ± 0.15 | 0.46 ± 0.16 |
| Example 2 | 0.31 ± 0.17 | 0.34 ± 0.11 | 0.30 ± 0.12 | 0.34 ± 0.09 |
| Example 3 | 0.41 ± 0.19 | 0.40 ± 0.08 | 0.41 ± 0.17 | 0.41 ± 0.16 |
| Example 4 | 0.38 ± 0.12 | 0.83 ± 0.17 | 0.37 ± 0.21 | 0.36 ± 0.17 |
| Example 5 | 0.45 ± 0.22 | 0.45 ± 0.13 | 0.43 ± 0.15 | 0.45 ± 0.14 |
| Example 6 | 0.36 ± 0.13 | 0.38 ± 0.12 | 0.35 ± 0.08 | 0.37 ± 0.11 |
| Control group | 0.95 ± 0.14 | 1.23 ± 0.75 | 0.83 ± 0.51 | 0.77 ± 0.19 |

The test results show that, when applying the comprehensive control method for nitrogen and phosphorus emissions in facility farmlands in the present disclosure during the planting process of the cucumber, tomato, pepper and custard squash, downward leaching of the nitrogen and phosphorus in the soil can be significantly controlled. Compared with the control group, the reduction rate of total nitrogen loss and total phosphorus loss of different vegetables after treatment in each example ranged from 40% to 60% and 50% to 70% respectively. Due to different nutrient requirements of different vegetables, the nitrogen and phosphorus loss amount of the four greenhouse vegetables have no obvious rules under the same conditions. Wherein the highest reduction rate of total nitrogen loss of Example 2 in cucumber greenhouse is 56.9%, and the highest reduction rate of total phosphorus loss of Example 2 in pepper greenhouses is 68.4%, which has a better effect on reducing the nitrogen and phosphorus losses than other examples.

The above descriptions are merely preferred embodiments of the present disclosure. It should be indicated that, improvements and modifications may be made by those ordinary skilled in the art without departing from the principle of the present disclosure. These improvements and modifications shall be considered as the protection scope of the present disclosure.

What is claimed is:

1. A composite organic material for joint control of nitrogen and phosphorus emissions in farmlands, consisting of the following components in parts by weight: 200-250 parts of edible fungi residues, 300-350 parts of charcoal and 5-10 parts of rhamnolipid, wherein the composite organic material is mixed, then fermented at 40-60° C. for 20-30 days.

2. The composite organic material according to claim 1, wherein the composite organic material is prepared by a method comprising: mixing composite organic materials; adjusting initial moisture content to 60-70%; carrying out ventilated aerobic fermentation; turning piles once every 4-5 days during fermentation; and ensuring moisture content of the fermented material to be 30-40%.

* * * * *

SEQUENCE LISTING

<160> NUMBER OF SEQ ID NOS: 1

<210> SEQ ID NO 1
<211> LENGTH: 1414
<212> TYPE: DNA
<213> ORGANISM: Artificial Sequence
<220> FEATURE:
<223> OTHER INFORMATION: 16SrDNA gene sequence

<400> SEQUENCE: 1

```
gttacctcac cgacttcggg tgttacaaac tctcgtggtg tgacgggcgg tgtgtacaag      60
gcccgggaac gtattcaccg cggcatgctg atccgcgatt actagcgatt ccagcttcac     120
gcagtcgagt tgcagactgc gatccgaact gagaacagat ttgtgggatt ggcttagcct     180
cgcggcttcg ctgcccttcg ttctgcccat tgtagcacgt gtgtagccca ggtcataagg     240
ggcatgatga tttgacgtca tccccacctt cctccggttt gtcaccggca gtcaccttag     300
agtgcccaac tgaatgctgg caactaagat caagggttgc gctcgttgcg ggacttaacc     360
caacatctca cgacacgagc tgacgacaac catgcaccac ctgtcactct gcccccgaag     420
gggaagccct atctctaggg ttgtcagagg atgtcaagac ctggtaaggt tcttcgcgtt     480
gcttcgaatt aaaccacatg ctccaccgct tgtgcgggcc cccgtcaatt cctttgagtt     540
tcagtcttgc gaccgtactc cccaggcgga gtgcttaatg cgtttgctgc agcactaaag     600
ggcggaaacc ctctaacact tagcactcat cgtttacggc gtggactacc agggtatcta     660
atcctgttcg ctccccacgc tttcgcgcct cagcgtcagt tacagaccag agagtcgcct     720
tcgccactgg tgttcctcca catctctacg catttcaccg ctacacgtgg aattccactc     780
tcctcttctg cactcaagtt ccccagtttc caatgaccct ccccggttga gccgggggct     840
ttcacatcag acttaaagaa ccgcctgcgc gcgctttacg cccaataatt ccggacaacg     900
cttgccacct acgtattacc gcggctgctg gcacgtagtt agccgtggct ttctggttag     960
gtaccgtcaa ggtaccgccc tgttcgaacg gtacttgttc ttccctaaca acagagtttt    1020
acgatccgaa aaccttcatc actcacgcgg cgttgctccg tcagactttc gtccattgcg    1080
gaagattccc tactgctgcc tcccgtagga gtctgggccg tgtctcagtc ccagtgtggc    1140
cgatcaccct ctcaggtcgg ctacgcatcg tcgccttggt gagccgttac cccaccaact    1200
agctaatgcg ccgcgggtcc atctgtaagt ggtagcgaaa agccacctttt tatgtttgaa    1260 ccatgcggtt caaacaagca tccggtatta gccccggttt cccggagtta tcccagtctt    1320
acaggcaggt tacccacgtg ttactcaccc gtccgccgct gacctaaggg agcaagctcc    1380
cgtcggtccg ctcgacttgc atgtatagca cccc                                1414
```